Figure 1:
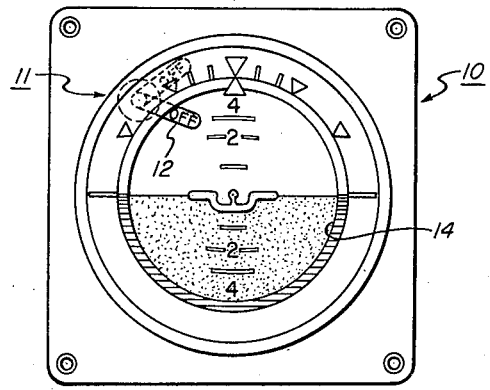

March 6, 1962  F. M. POTTER  3,024,451
ALTERNATING CURRENT FAIL SAFE SYSTEM
Filed May 12, 1959  2 Sheets-Sheet 1

INVENTOR
FRANCIS M. POTTER
BY
ATTORNEY

March 6, 1962 F. M. POTTER 3,024,451
ALTERNATING CURRENT FAIL SAFE SYSTEM
Filed May 12, 1959 2 Sheets-Sheet 2

INVENTOR
FRANCIS M. POTTER
BY
ATTORNEY

United States Patent Office 3,024,451
Patented Mar. 6, 1962

3,024,451
ALTERNATING CURRENT FAIL SAFE SYSTEM
Francis M. Potter, Garden City, N.Y., assignor to Sperry Rand Corporation, Great Neck, N.Y., a corporation of Delaware
Filed May 12, 1959, Ser. No. 812,616
4 Claims. (Cl. 340—253)

This invention relates to a system for indicating faulty conditions in a load circuit connecting an alternating current electrical supply source to electrical apparatus having a gyroscopic rotor driven by a polyphase induction motor.

An object of the invention is to provide an electrical fail safe system that requires a minimum of power from a polyphase circuit for its operation. The improved system is equally adaptable to use in two as well as three phase electrical supply circuits. It is effective to detect open conditions in the lines of the polyphase circuit connecting the source to the motor and a condition of failure of the power source.

The improved system includes an output element in the form of an electrically responsive meter having a flag that moves between a fault indicating position and a fault free indicating position. Operation of the flag is effected by the output of a circuit containing three additively combined voltages at the third harmonic frequency of the fundamental frequency of the alternating current supply source. The indicating system provides such an output when there are no faults present, the flag of the meter being located in its fault free indicating position under such condition. The current transformer in the load circuit and the circuitry connecting the transformers to the operating meter provide the characteristic features of the present invention.

Other objects, features and structural details of the invention will become apparent from the following description in connection with the accompanying drawings showing both two phase and three phase embodiments thereof.

Figure 2:
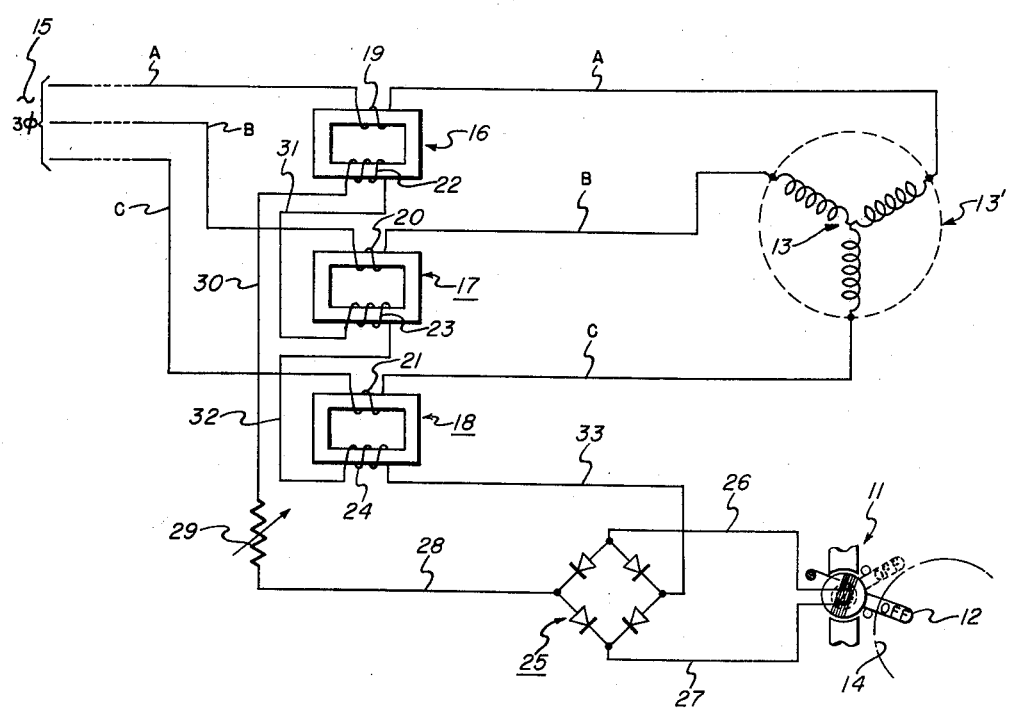
Figure 3:
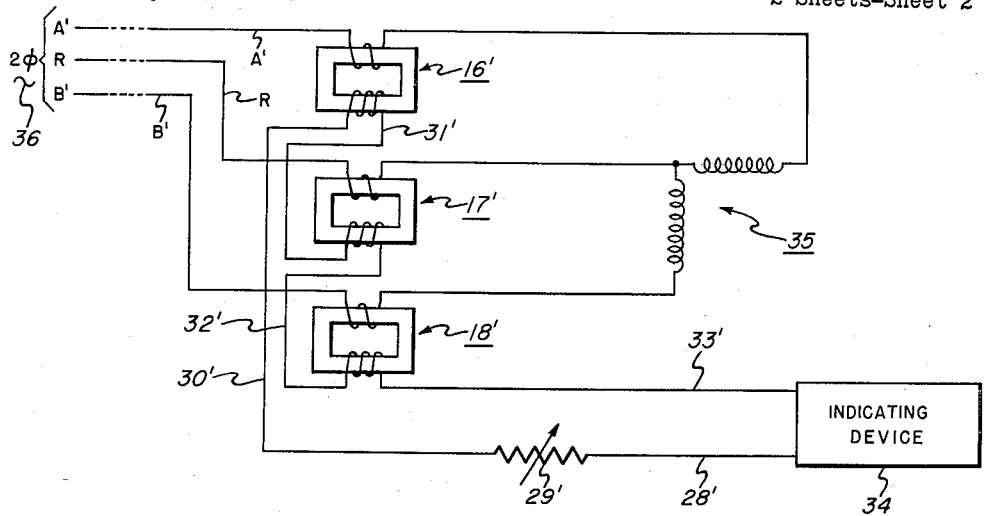
Figure 4:
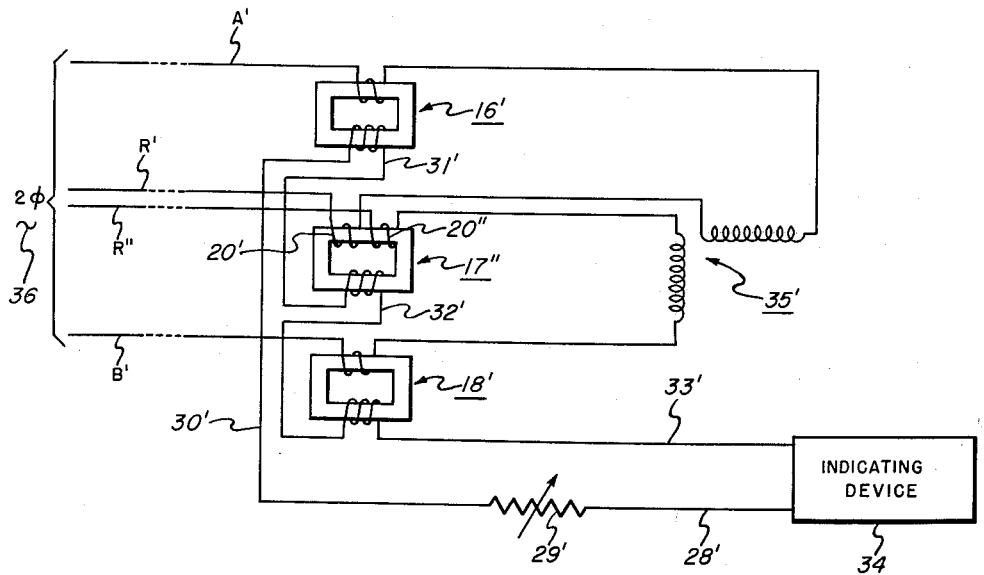

In the drawings,

FIG. 1 is a front elevation view of the face of a gyro horizon instrument in which the indicator of the meter component of the system is shown as an off-on flag, FIG. 2 a schematic wiring diagram of a three phase embodiment of the improved system wherein the meter is a suitable galvanometer, FIG. 3 is a view similar to FIG. 2 of an embodiment of the invention in a two phase, three wire, electrical supply circuit, and FIG. 4 is a view similar to FIGS. 2 and 3, of an embodiment of the invention in a two phase, four wire, electrical supply circuit.

In the embodiment of the invention shown in FIGS. 1 and 2, the improved fault indicating system is incorporated for use in a gyro horizon apparatus as indicated generally at 10. With a flag type indicator such as utilized in this apparatus to show malfunction conditions, the system provides for actuation of the flag by an electrical meter 11 of the moving coil galvanometer type having a movable element 12 in the form of a flag with an off designation thereon. The load for the polyphase system is represented in FIG. 2 as the windings of a three phase squirrel cage motor 13 such as is employed to drive the gyroscopic rotor 13' of the horizon apparatus. The fault indicating meter 11 and flag element 12 in the embodiment shown are mounted within the gyro apparatus housing so that the flag appears in a window 14 at the face of the housing to the view of the human pilot as shown in the full line position of the flag in these views. Under any of the noted conditions of effectiveness of the system, the movable element or flag 12 is biased by a spring connected to the coil element of the galvanometer in its off indicating condition to the human pilot. When the apparatus is functioning normally with an alternating current supply of electrical energy to the gyro motor 13, the improved fault indicating system is operable to move the flag element 12 above the window 14 and out of the field of view of the human pilot in the described embodiment of the invention. The meter 11 includes suitable stops to limit the angular movement of the element 12 of the fault indicating device or meter 11 with relation to window 14 of the gyro horizon apparatus. The indicating meter 11 for the output of the system includes a flag 12 movable between a position indicative of a fault in the system and a position in which the system is fault free. In the first instance, the off flag of the indicating apparatus in the illustrative apparatus is visible to the human pilot at the window 14. In the second instance, the flag element 12 is behind the mask that outlines the window 14 and is accordingly not seen by the human pilot observing the indicating face of the apparatus. Leads A, B and C, connect the respective windings of the three phase motor 13 to a suitable three phase alternating current electrical energy source as indicated at 15.

As shown in FIG. 2, the improved system includes three electrical couplings adapted to receive an input from the load circuit indicated as provided by low current transformers 16, 17 and 18, having respective primary windings 19, 20 and 21 in each of the supply leads A, B and C. The transformer means are designed so that the respective laminated cores thereof saturate at about one-half of the sine wave peak of the normal running current supplied to the motor 13 from the supply source. At core saturation, the secondary windings 22, 23 and 24, reproduce voltages at the fundamental frequency of the line together with a relatively high third harmonic frequency. The system includes the respective secondary windings 22, 23 and 24 of the coupling transformers in a third harmonic voltage output circuit to a bridge type rectifier 25 in the instant case whose direct current output is fed by way of leads 26, 27 to the moving coil element 12 of the galvanometer 11. The coupling output circuit to the rectifier 25 includes lead 28, variable resistor 29, lead 30, the secondary winding 22 of transformer 16, lead 31, the secondary winding 23 of transformer 17, lead 32, the secondary winding 24 of transformer 18 and lead 33. Resistor 29 is included in the combining circuit to adjust its output.

Under conditions where there is no fault in the power circuit between the supply and transformers, as well as no fault at the supply source, the fundamental frequency voltages in the output circuit cancel and the added third harmonic voltages provide the output of the system. The coil element of the meter 11 constitutes a means that is operable by the output of the circuit to move the flag 12 to its fault free position behind the window portion 14 of the gyro horizon.

With an open in one of the leads between the supply source and the motor 13, there is no flow of current in the primary winding of the transformer in the open line and no output from its secondary winding. Upon such condition, the system comprises a two line circuit between the source and motor 13 having two transformers therein with the respective primary windings in opposed series relation. The current flow in the primary windings is in opposite directions and the voltages induced in the secondary windings of the transformers in the output circuit are equal and opposite in polarity both at the fundamental frequency and the third harmonic frequency as well as all other frequencies. The combining circuit of the system accordingly produces no output under such condition. With an open condition in two of the leads, the meter 11 indicates off as there is no current in any of the transformers. The system also detects shorted conditions between two of the leads ahead of the transformers as in this event only a single transformer is conducting and its output is insufficient to effect operation of the device 11. Grounded conditions of one, two or all of the leads ahead of the transformers are detected by the system by its operation either in two transformer or one transformer sense. It is apparent that with failure of the power source, there is no voltage induced in any of the secondary windings of the transformers. With an insufficient or null input to the meter 11, the movable flag 12 is returned to its visible position in the window 14 of the gyro horizon apparatus by the spring connected to the moving coil of the galvanometer.

The transformers of the system are designed to perform satisfactorily with approximately a two volt drop across the primary windings which does not materially affect the performance of the motor 13 spinning the gyroscopic rotor of the apparatus. The system accordingly requires very low power for its operation and is fail safe per se in that an open or short in its output circuit would also result in an indication of a faulty condition.

In the embodiment of the invention shown in FIG. 3, a suitable electrical indicating device, generally indicated at 34, includes a movable member that is also responsive to the summing secondary output circuit of the system. Such a device may be provided by a conventional rectifier and direct current relay with an armature movable between two determined positions in the manner heretofore described. The load provided, in this instance, is a two phase motor 35 whose input is received from a suitable two phase source 36 of electrical energy by way of supply leads A', B'. The return or third lead of the two phase, three lead, supply circuit is indicated at R. As shown, the primary windings of the transformers 16', 18', are connected in the supply leads A', B', respectively. The transformer 17' of the system has its primary winding connected in the return line R. As shown in FIG. 3, the controlling third harmonic output circuit fed to the indicating device 34 includes lead 28', variable resistor 29', lead 30', the secondary winding of transformer 16', lead 31', the secondary winding of transformer 17', lead 32', the secondary winding of transformer 18' and lead 33'.

The performance of the indicating system of the two phase, three line circuit differs from the three phase system due to the difference in the phase relations of the voltages of the source so that there is substantial rather than complete cancellation of the fundamental frequency voltages in the output circuit under fault free conditions of operation. This system like the three phase system requires the summation of the three third harmonic voltages in its output circuit to obtain the necessary power to effect operation of the indicating device. In this system, an open in any one of the input leads results in a two transformer type of operation as heretofore described in which the two fundamental frequency voltages as well as the two third harmonic frequency voltages in the output circuit cancel. Single transformer and no transformer type of operations are identical to that heretofore described.

The two phase, four line system shown in the embodiment of the invention in FIG. 4 differs from the showing in FIG. 3 in the provision of separate return lines R', R" for the two phase motor 35'. In this instance, the transformer 17" is provided with a primary winding 20' connected in the third line R' of the system as well as a secondary primary winding 20" connected in the fourth line R". The secondary winding of the transformer 17" is the same as that provided for the transformer 17' in the system shown in FIG. 3. The first and second supply lines A' and B' and the output circuit of the system are identical to that shown in FIG. 3. In the four line system, there is also substantial rather than complete cancellation of the fundamental frequency voltage in the output circuit under fault free conditions of operation. Upon fault indication, resulting from either dual or single transformer type operations, the performance of the four line system is the same as that of the three line, two phase and three phase systems.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. An alternating current fail safe system including electrical apparatus having a gyroscopic rotor, a polyphase induction motor operable to spin the rotor, an alternating current supply source, a polyphase load circuit with lines connecting the souce to the motor, a low current saturable transformer having a series connected primary winding in one of the lines of the circuit and a secondary winding producing a fundamental and third harmonic frequency voltage output, a low current saturable transformer having a series connected primary winding in a second line of the circuit and a secondary winding producing a fundamental and third harmonic frequency voltage output, a low current saturable transformer having a series connected primary winding in a third line of the circuit and a secondary winding producing a fundamental and third harmonic frequency voltage output, a combining circuit for the outputs of the three current transformers cancelling the fundamental voltages and adding the three harmonic frequency voltages when the system is free of fault, and a meter having a spring biased flag connected to said combining circuit to indicate an in fault condition of the system and indicate a fault free condition of the system.

2. An alternating current fail safe system including electrical apparatus having a gyroscopic rotor, a three phase induction motor operable to spin the rotor, a three phase alternating current supply source, a three phase circuit with lines connecting the source to the motor, a low current saturable transformer having a series connected primary winding in the first of the phase lines of the circuit and a secondary winding with a fundamental and third harmonic frequency voltage output, a low current saturable transformer having a series connected primary winding in the second of the phase lines of the circuit and a secondary winding with a fundamental and third harmonic frequency voltage output, a low current saturable transformer having a series connected primary winding in the third of the phase lines of the circuit and a secondary winding with a fundamental and third harmonic frequency voltage output, and an output circuit connecting the secondary windings of the three current transformers providing cancellation of the three fundamental frequency voltages and summation of the three harmonic frequency voltages when the system is free of fault having a meter therein with a spring biased flag movable between a position indicating the system to be in fault and a position indicating the system to be fault free.

3. An alternating current fail safe system including electrical apparatus having a gyroscopic rotor, a two phase induction motor operable to spin the rotor, a two phase alternating current supply source, a two line input circuit and single line return circuit connecting the source to the motor, a low current saturable transformer having a series connected primary winding in one of the input lines of the connecting circuit and a secondary winding producing a fundamental and third harmonic frequency voltage output, a low current saturable transformer having a series connected primary winding in the other of the input lines of the connecting circuit and a secondary winding producing a fundamental and third harmonic frequency voltage output, a low current saturable transformer having a series connected primary winding in the return line of the connecting circuit and a secondary winding producing a fundamental and third harmonic frequency voltage output, an output circuit connecting the secondary windings of the three current transformers providing substantial cancellation of the three fundamental frequency voltages and summation of the three harmonic frequency voltages when the system is free of fault, and a meter operatively connected to said output circuit having a spring biased flag movable between a position indicating the system to be in fault and a position indicating the system to be fault free.

4. An alternating current fail safe system including electrical apparatus having a gyroscopic rotor, a two phase induction motor operable to spin the rotor, a two phase alternating current supply source, a two line input circuit and two line return circuit connecting the source to the motor, a low current saturable transformer having a series connected primary winding in one of the input lines of the connecting circuit and a secondary winding producing a fundamental and third harmonic frequency voltage output, a low current saturable transformer having a series connected primary winding in the other of the input lines of the connecting circuit and a secondary winding producing a fundamental and third harmonic frequency voltage output, a low current saturable transformer having series connected primary windings in the two return lines of the connecting circuit and a secondary winding producing a fundamental and third harmonic frequency voltage output, an output circuit connecting the secondary windings of the three current transformers providing substantial cancellation of the three fundamental frequency voltages and summation of the three harmonic frequency voltages when the system is free of fault, and a meter operatively connected to said output circuit having a spring biased flag movable between a position indicating the system to be in fault and a position indicating the system to be fault free.

References Cited in the file of this patent
UNITED STATES PATENTS

| | | |
|---|---|---|
| 1,929,059 | Fitzgerald | Oct. 3, 1933 |
| 2,474,290 | Terry | June 28, 1949 |
| 2,634,404 | Carmichael | Apr. 7, 1953 |
| 2,941,121 | Gladnick | June 14, 1960 |